(12) United States Patent
Metzler et al.

(10) Patent No.: US 10,321,116 B2
(45) Date of Patent: Jun. 11, 2019

(54) METHOD AND SYSTEM FOR VOLUME DETERMINATION USING A STRUCTURE FROM MOTION ALGORITHM

(71) Applicant: HEXAGON TECHNOLOGY CENTER GMBH, Heerbrugg (CH)

(72) Inventors: Bernhard Metzler, Dornbirn (AT); Knut Siercks, Mörschwil (CH); Andreas Pfister, St. Gallen (CH); Roman Parys, Rebstein (CH); Thomas Fidler, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 315 days.

(21) Appl. No.: 14/335,596

(22) Filed: Jul. 18, 2014

(65) Prior Publication Data
US 2015/0022640 A1 Jan. 22, 2015

(30) Foreign Application Priority Data
Jul. 22, 2013 (EP) .................................... 13177503

(51) Int. Cl.
*G01F 17/00* (2006.01)
*G01B 11/00* (2006.01)
(Continued)

(52) U.S. Cl.
CPC .......... *H04N 13/282* (2018.05); *G01B 11/00* (2013.01); *G01F 17/00* (2013.01); *G06T 7/62* (2017.01);
(Continued)

(58) Field of Classification Search
CPC .......... G01B 11/00; G01F 17/00; G06T 7/62; H04N 13/0221; H04N 13/0271
See application file for complete search history.

(56) References Cited

U.S. PATENT DOCUMENTS

| 7,399,220 B2 | 7/2008 | Kriesel et al. |
| 8,345,930 B2 | 1/2013 | Tamrakar et al. |
| (Continued) | | |

FOREIGN PATENT DOCUMENTS

| CN | 1286395 A | 3/2001 |
| CN | 101266131 A | 9/2008 |
| (Continued) | | |

OTHER PUBLICATIONS

European Search Report for Application No. EP 13 17 7503 completed on May 23, 2014.

*Primary Examiner* — Nathnael Aynalem
(74) *Attorney, Agent, or Firm* — Maschoff Brennan

(57) ABSTRACT

A volume determining method for an object on a construction site is disclosed. The method may include moving a mobile camera along a path around the object while orienting the camera repeatedly onto the object. The method may include capturing a series of images of the object from different points on the path and with different orientations with the camera, the series being represented by an image data set; performing a structure from motion evaluation with a defined algorithm using the series of images and generating a spatial representation; scaling the spatial representation with help of given information about a known absolute reference regarding scale; defining a ground surface for the object and applying it onto the spatial representation; and calculating and outputting the absolute volume of the object based on the scaled spatial representation and the defined ground surface.

19 Claims, 7 Drawing Sheets

(51) Int. Cl.
*G06T 17/10* (2006.01)
*H04N 13/282* (2018.01)
*H04N 5/232* (2006.01)
*G06T 7/62* (2017.01)
*H04N 13/211* (2018.01)
*H04N 13/221* (2018.01)
*H04N 13/271* (2018.01)

(52) U.S. Cl.
CPC ........... *H04N 5/232* (2013.01); *H04N 13/211* (2018.05); *H04N 13/221* (2018.05); *H04N 13/271* (2018.05)

(56) References Cited

U.S. PATENT DOCUMENTS

| | | | |
|---|---|---|---|
| 9,196,084 B2* | 11/2015 | Boardman | G06T 17/00 |
| 2011/0185868 A1* | 8/2011 | Schmidt | A47J 43/00 |
| | | | 83/77 |
| 2012/0304763 A1* | 12/2012 | Troxler | G01B 11/00 |
| | | | 73/32 R |
| 2013/0028478 A1 | 1/2013 | St. Pierre | |
| 2014/0270524 A1* | 9/2014 | Diamond | G06K 9/6298 |
| | | | 382/170 |

FOREIGN PATENT DOCUMENTS

| | | |
|---|---|---|
| CN | 101936761 A | 1/2011 |
| CN | 102135418 A | 7/2011 |
| CN | 102859317 A | 1/2013 |
| KR | 10-2013-0051838 A | 5/2013 |

\* cited by examiner

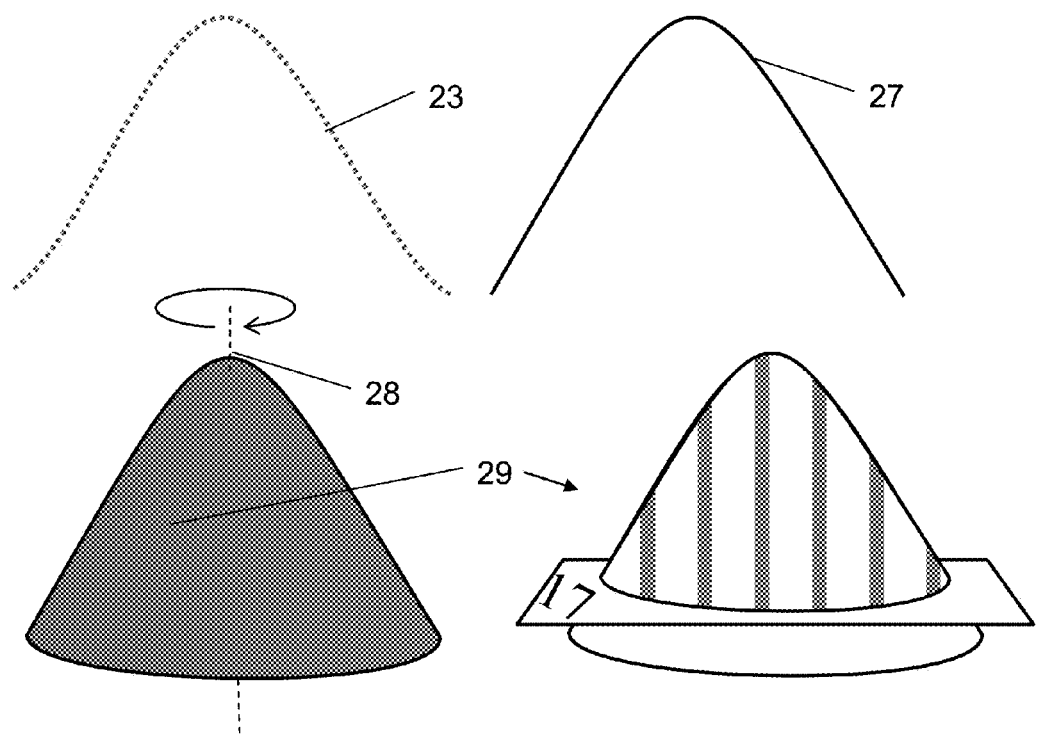
Fig 6b
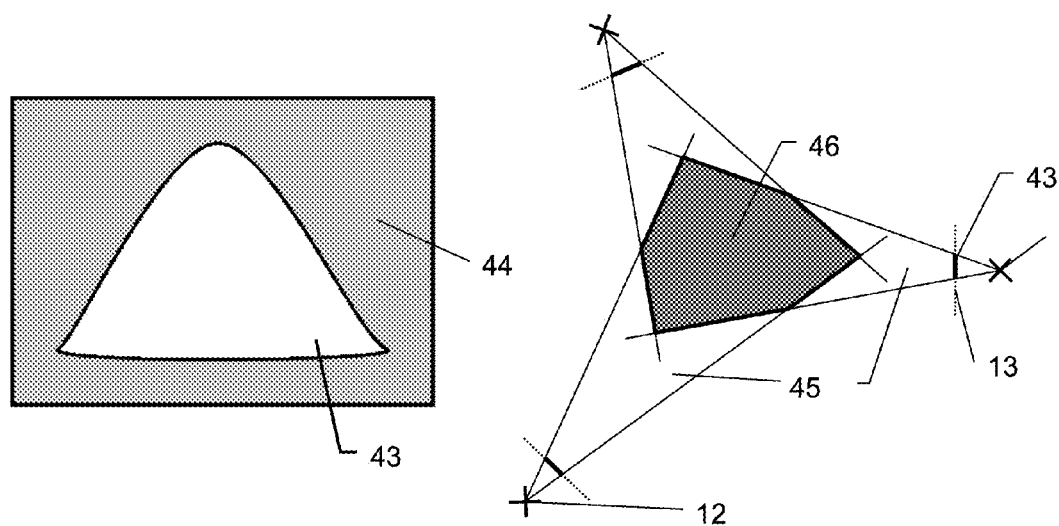
Fig 7a
Fig 7b

METHOD AND SYSTEM FOR VOLUME DETERMINATION USING A STRUCTURE FROM MOTION ALGORITHM

FIELD

Embodiments described herein relates to a method and a system for determination of the volume of an object on a construction site.

BACKGROUND

On a construction site it is often necessary to determine the volume of an object, for example of a stock pile or a hollow space like a pothole, a gap or a mine.

A conventional approach for determination of such volumes is scanning the object with a measuring device such as a laser scanner, a total station, a stereo camera or a set of fixedly mounted cameras. As from one station point only parts of the stock pile are measurable while other surface points are hidden, it is necessary to set up the measuring devices at at least three different positions with respect to e.g. the stock pile such that in combination the whole surface of the stock pile is measurable. The stock pile is captured from each station point, i.e. the spatial positions of surface points of the stock pile with respect to the measuring device are measured. Next, the point clouds resulting from three or more setups are combined and meshed. Then, the volume between the meshed surface and a ground surface is computed. A major disadvantage of such an approach is the fact that measuring devices such as a laser scanner, a total station, a stereo camera or a plurality of cameras are expensive hardware and have to be operated and positioned by a skilled user. Additionally, a setup of such a measuring device at three different positions and determining these positions at least relatively to each other is time consuming. However, in some cases this effort in time and money is somehow wasteful as the high accuracy of position measurement performed by a geodetic measuring device like a total station and the resulting high accuracy of the volume determination is not required, but a rather rough value for the volume would be sufficient.

For determining the volume of large objects or for covering multiple objects in large areas it is further known to use an unmanned aerial vehicle (UAV), equipped with a GNSS positions sensor and means for determining dimensional data of terrestrial objects.

SUMMARY

Some embodiments provide for a simplified method and system for determination of the volume of an object on a construction site.

Some embodiments provide for a method for determination of the volume of an object on a construction site which is less time consuming.

Some embodiments provide for a cost-efficient system for determination of the volume of an object on a construction site.

Some embodiments provide for a method for determining the volume of an object on a construction site.

Some embodiments include a method for determining the volume of an object or a hollow space on a construction site comprises the steps of a) moving a mobile camera along a path around the object while orienting the camera repeatedly, in particular continuously, onto the object, b) in the course of this, capturing a series of images of the object with the camera, the series comprising a plurality of images captured from different points on the path and with different orientations of the camera, the series being represented by an image data set collected thereby, c) performing a structure from motion evaluation with a defined algorithm using the series of images and generating a spatial representation of the surface of the object therefrom, d) scaling and particularly vertically orienting the spatial representation with help of given information about a known absolute reference regarding scale and particularly also absolute vertical direction, e) defining a ground surface for the object and applying it onto the spatial representation and f) calculating and outputting (33b) the absolute volume of the object based on the scaled and vertically oriented spatial representation and the defined ground surface.

In the context of the present disclosure, the term "absolute" (reference, vertical direction, volume, . . . ) means that a value of a quantity can be quantified in units of one and the same known scale, particularly in one of the standard lengths units (meter, inch, . . . ).

The mobile camera is capable of capturing a series of images which are storable as an image data set e.g. a set of still images, a video sequence or a combination of these. The mobile camera is part of a system for volume determination of an object on a construction site, the system compromising further a control and evaluation unit. The image data set can be stored on the mobile camera or on a storage unit of the system. The system may compromise a display, particularly with a touch sensitive interface. For example, this system can be a smartphone or a controller of a total station or a GNSS measurement system with a stored program with code so as to control and execute a volume determination functionality compromising the method as described above. The control and evaluation unit can be situated in the smartphone, the controller and/or in the mobile camera and/or in another part of the system such that some or all of steps c) to f) or a part of a step c) to f) are/is performed by the smartphone, the controller and/or in the mobile camera and/or in another part of the system. The system may compromise a computation server and data transmitting units such that some or all of steps c) to f) or a part of a step c) to f) can be performed off-site, which can be of advantage with respect to power consumption of the mobile part of the system or with respect to processing power and therefore processing time. As an example, the image date set captured with a smartphone can be transferred to a cloud server, where the image data is processed according to embodiments described herein such that finally the volume is calculated and outputted. The outputted volume can be transferred back to the smartphone and displayed to the user.

Steps c) to f) may not be performed on the construction site and can be performed anytime after steps a) and b). The method's steps can be performed in any suitable order. Particularly the order of steps d) and e) is exchangeable respectively both steps can be performed simultaneously. If sufficient data is generated in one still performed step such that a following step can already be started, both steps may be executed simultaneously. For example can a part of a point cloud be generated according to step c) which is sufficient to define a ground surface as this part of the point cloud include enough ground surface related points and/or to scale the point cloud as the given information about a known absolute reference refers to that part of the point cloud. For another example, generation of a spatial representation according to step c) can already be started while step a) and b) are still in progress as a number of images of the image series can be sufficient to generate a spatial representation of a part of the object of to generate a first, rough spatial representation of the whole object. Further data generated in a preceding step can be used to refine a result of a subsequent step.

In some embodiments, the camera is a built-in component of a hand-held unit, particularly a mobile field controller of a surveying system comprising a total station and/or GNSS-components. The hand-held unit may further compromise sensor means for determination of positions and/or changes of position and/or accelerations with absolute reference in dependency of motion of the camera, particularly an inertial measurement unit fixed with respect to the camera and also forming a built-in component of the hand-held unit and/or a GNSS-Sensor fixed with respect to the camera and also forming a built-in component of the hand-held unit.

The capturing of a series of images of the object (step b) with the camera along a path around the object can be performed by a user by walking around the object while holding the camera permanently or at different points of the paths, which may be arbitrary chosen, in such a way, that at least a major, particularly the whole, visible side of the object facing to the camera is in the field of view of the camera. It is thereby not necessary to maintain a certain orientation of the camera. The camera can capture images repeatedly while being moved around the object with a rate of at least one picture per second. Particularly a video stream is generated with a video frame rate of at least 15 Hz.

From the image data set, in step c) a spatial representation of the object's surface is computed, e.g. a 3d model, particularly a point cloud. This is done by a defined structure-from-motion (SFM)—or simultaneous-localization-and-mapping (SLAM)—algorithm which is part of the stored program with code. The algorithm can be based on a perspective or affine camera projection model with observation sources which compromises image pairs, image tuples and/or a video sequence and token types such as sparse feature correspondence, dense optical flow field, lines or curves, or direct SFM-techniques that do not extract any tokens from the images.

As an example, the following SFM-algorithm is described, which compromises a step where a number of image correspondences are found for at least some of the images of the image data set. This is done using feature detection and matching algorithms such as SIFT, SURF, BRISK, BRIEF, etc. Alternatively, in case of a video sequence, the correspondences can be found using a tracking algorithm on each video frame. Tracking can be done using e.g. Kanade-Lucas-Tomasi (KLT) feature tracker or another tracking algorithm.

Using a suitable pair of images the relative camera pose, i.e. position and orientation, is determined in a local coordinate frame. The algorithm uses a robust search to find a 3D translation and rotation of the camera of the selected pair of images, e.g. the relative position and orientation of the second image with respect to the first image. With these positions the 3D position of all features seen in both images is computed using forward intersection. This gives a set of 3D points and the positions and orientations of the two initial frames.

In the next step additional frames are added to the existing reconstruction. Using already reconstructed 3D points, the position and orientation, which the camera had during capture of an image, can be computed using resectioning. After adding a new image, the positions of 3D points are refined using all measurements in the reconstructed frames.

As a final or intermediate step, the overall solution is refined using bundle adjustment. This part of the algorithm is a non-linear least squares minimization of the re-projection error. It will optimize the location and orientation of all camera positions and all 3D points.

If the recording contains multiple images from the same location, e.g. the user when moving around the object walks to the starting point and some meters beyond which causes an overlap, these images from the same location are matched and the loop around the object is closed. This will increase the overall accuracy.

Additional constraints, e.g. positions of the cameras from GNSS measurements, positions of reference targets from measurements with a total station, can be included in the bundle adjustment to increase the robustness of the algorithm.

Alternatively, other SLAM or SFM algorithms can be used to recover the positions and orientations of the cameras. To further speed up the process, images can be transferred to the control and evaluation unit during the recording of the data.

In a further development of the method, a further improvement of the spatial representation of the object's surface can be achieved by computing a dense point cloud, e.g. a 3D-coordinate for each image pixel, with an algorithm such as dense matching algorithm, e.g. depth map fusion or plane sweeping.

As an alternative for determining a spatial representation as described above, a spatial representation can be creating using a visual hull approach. In this space carving technique, one first finds the silhouette contours of a foreground object in the images. Each image region outside of the silhouette represents a region of space where the object cannot be. These regions can be carved away. The resulting volume, called the visual hull, is a conservative approximation to the actual geometry of the object. Object silhouettes are often easy to detect in images, and these methods can be quite robust. In embodiments described herein, a visual hull approach can be used to segment in an image the object's representation from the background, thus defining a shape with a defined outline. Outgoing from the projection center of the camera, half-lines respectively triangles are defined going through points respectively sections of the outline, which form together a cone respectively a pyramid. The spatial intersection of all cones respectively pyramids defined using all images defines the spatial representation of the object.

According to step d), the spatial representation is to be scaled with help of given information about a known absolute reference. Advantageously, also the vertical orientation of the spatial representation is determined using a known vertical reference. This is performed by one of the following options:

Usage of a reference body, particularly an elongated reference body, that defines a long axis due to its elongated shape and comprises at least two defined visually detectable markings, whereby at least two points are defined on the reference body, for example a scale bar or a bar with two or more optical markers in a defined distance to each other. An absolute distance in between the at least two points, particularly also the spatial relationship of the at least two points with respect to the long axis of the body, are known. This reference body is to be placed by a user—with its long axis aligned vertically if the spatial representation is additionally to be oriented vertically—on or next to the object of which the volume is to be determined before capturing the series of images. The reference body is imaged on at least some images together with the object. At least two spatial positions relative to the spatial representation of the object are determined for the at least two points also based on the structure-from-motion-evaluation. Then, the spatial representation is scaled based on a measured distance in between the determined at least two spatial positions and the known absolute distance in between the at least two points of the reference body. Additionally, the spatial representation can be vertically oriented based on the determined at least two spatial positions relative to the spatial representation and the known spatial relationship of the at least two points with respect to the long axis, if the reference body is placed vertically on the object.

Such a reference body can also be formed by defined points on the object to be measured with known distance, detectable in at least some images or on an object additionally captured in at least some images, which have a known distance. This known distance can be derived by a measurement with a measurement device such as a distometer, which can be integrated in the system. A visually detectable point on the object to be measured or on an additional object can be defined by distinct points on/off the object such as an edge or a spot with a different property compared to the surrounding. A visually detectable point can further compromise an optical marking such as a color spot or a geometric shape like a circle. As an example, a reference body can thus be formed by a length of the object to be measured or on an additional object with known dimensions, such as the height or width of an object or of a part of it. Such an additional object may particularly compromise a scale bar. Advantageously, at least two of these captured visually detectable points and/or markings are aligned vertically with respect to each other. Alternatively, two or more elongated reference bodies such as scale bars can be placed on the object or close by. If two scales bars are horizontally aligned, e.g. by a bubble level, they define a horizontal plane. Then the normal vector of this plane defines the vertical direction.

Positions and/or changes of position and/or accelerations of the camera are determined with absolute reference (i.e. with regard to a defined scale) in dependency of the motion of the camera along its path around the object. The spatial representation is then scaled and preferably vertically oriented based on the determined positions and/or changes of position and/or accelerations, respectively. The positions and/or changes of position and/or accelerations can be determined by one of the following options or a combination of them:

A GNSS position of the camera is measured for at least two different camera positions by a GNSS-sensor fixed with respect to the camera. If the spatial representation is also to be aligned vertically and/or georeferenced, a GNSS position is measured for at least three camera positions. A transformation is determined that scales, and optionally also shifts and rotates, the point cloud such that the difference between the position of the GNSS measurement (phase center) and the corresponding position resulting from structure from motion is minimal.

Usage of an inertial measurement unit (IMU), which is fixed with respect to the camera. The measured accelerations and angular rates are used to measure the relative position and orientation between pairs of images. Using this relative positions a shift rotation and scale of the point cloud can be found that minimizes the difference between the measured relative positions and the relative positions of the transformed camera positions.

A measurement device such as a tachymeter, total station, laser tracker measures or a tracking 3d-position-determining camera-system, particularly a stereo-camera-system or a pattern-projector-camera-system, positions of the camera for at least two different camera positions. Determination of a position and/or orientation of the camera can be performed synchronously or in a defined time interval to capturing an image such that a determined position and orientation is clearly assigned to an image. For this purpose, a trigger signal can be generated by the control and evaluation unit and be transferred to the camera and a GNSS sensor, IMU-unit or measurement device. Alternatively, the camera can trigger position and/or orientation determination by said positions determination devices when capturing an image or after a defined number of captured images or at defined time intervals.

At least two defined visually detectable markings, e.g. coded markers, are placed on the object or close by. Through the defined markings, at least two reference points are defined. The reference points are measured, i.e. their absolute spatial position is determined, with a surveying instrument, for instance a total station or a GNSS pole. The markings are also captured in at least some images of the image series together with the object. The markings can be automatically detected in the point cloud resulting from SFM. The relative spatial position with respect to the point cloud is determined also based on the SFM-evaluation. The transformation (scale and advantageously also vertical orientation) is carried out based on the assignment of the absolute spatial position to the relative spatial position of each reference point.

In step e), a ground surface for the object is determined and applied onto the spatial representation. The ground surface is automatically derived from the point cloud by a defined evaluation algorithm that analysis the shape of the spatial representation. A derivation of the ground surface can be based on a classification of a set of points lying on the ground surface. The classification can be based on the distribution of the points with respect to the z-axis (upward direction) and the assumption that the points with small z-coordinate are part of the ground surface. Alternatively, the user can classify the points by drawing a curve on the display of the system. Then, a mathematical shape, e.g. a plane, is fitted to the classified points, which represents the ground surface. Alternatively, the ground surface can be determined using 3D Hough transform or a RANSAC algorithm.

Alternatively, the ground surface can be determined using total station measurements or measurements from a GNSS pole, by three or more markers placed around the object on the ground or by two or more elongated reference bodies such as scale bars placed around the object on the ground.

Alternatively or additionally, the ground surface itself is derived manually by a user input. The user can visually analyze the spatial representation which is displayed on the display of the system and determine the ground surface manually or adjust an automatically derived ground surface. Particularly, a profile of the spatial representation, e.g. a cross section, is displayed and a line standing for the ground surface is settable at a desired location in and relative to the displayed profile.

In step f), the absolute volume of the object is calculated. First, a mathematically defined surface is fitted to the point cloud or a surface is computed from the point cloud based on meshing. Examples for the mathematically defined surface are 3D-spline, cone, free-form-surface or paraboloid of revolution. A computed surface can be derived based on meshing the spatial representation using a 3D- or 2D-triangulation. The volume is either computed as the difference between the mathematically defined surface and the ground surface or determined as the enclosed volume between the triangulated surface and the ground surface.

In some embodiments it might be impossible for the user to move the camera completely around the object. Therefore, the surface representation represents only part of the object. Then, symmetry assumptions are used to determine the object's volume. The user can define a symmetry plane and the volume of the part contained between ground surface and the symmetry plane is computed. The approximate volume would then be the computed volume multiplied by two. As an alternative, a symmetry axis can be specified, and the volume of the object will be approximated by creating a surface of revolution from a silhouette of the object. For example, from the cross section through the point cloud the outline, e.g. a parabolic curve, can be determined. Rotating that curve around the vertical center axis results in a paraboloid of revolution Beside the volume of the object, volume changes or volume differences of the object might be of interest to a user. The described method can be used to determine the volume, e.g. of a sand heap, before and after a removal of sand, to determine the volume difference.

In another embodiment, the dimensions, i.e. length, width, height, and the shape of the object can be determined from the spatial representation. Knowing the dimensions and the shape of a rigid object, e.g. a rock, it can be decided whether it fits on the loading platform of a truck. Moreover, it can be determined whether the object fits through the opening of the loading space, i.e. whether the width of the object is smaller than the width of the opening. Additionally or alternatively, the method can further developed to perform a slope analysis. Based on the shape of the object e.g. a heap of sand, and considering the material properties, e.g. the slope angle, it can be analyzed, what a removal of sand at a specific location would mean to the stability of the heap, i.e. whether the removal would cause a slide.

In a further embodiment, the determined volume is used together with a density value to calculate an absolute weight of the object, e.g. the stock pile. The density value is either inputted by the user, selected by the user with the help of a look-up-table which compromises several defined types of material and their respective density values and/or automatically determined by automatically estimating the material from at least one image of the series of images. In the latter case, texture information of the object can be used.

If the object is composed of sections of different material, the absolute weight of each section can be estimated by marking a section manually or based on an image segmentation algorithm.

In another further embodiment, the barycenter of the object is computed based on its spatial representation, which can be unscaled for this purpose. The computation can consider further information such as the weight of each section of a material in case of an inhomogeneous object. Furthermore, the computed barycenter can be combined with other stored or computed object properties. For example, information about the stiffness of the object and its barycenter can be used to derive hints to the user, how to handle the object in order to prevail damaging. For example, knowing the location of the barycenter, it can be decided e.g. where to put the ropes for lifting a rigid object with a crane or how to grab it with a forklift with respect to a good balance. Moreover, knowing the barycenter the object can optimally be placed on the loading platform of a truck, e.g. to balance the load equally between the front and rear axle.

Some embodiments include a computer program product for executing the steps c) to f) of the present volume determining method.

BRIEF DESCRIPTION OF THE FIGURES

Embodiments disclosed herein may be described in detail by referring to exemplary embodiments that are accompanied by figures, in which.

DETAILED DESCRIPTION

Figure 1:
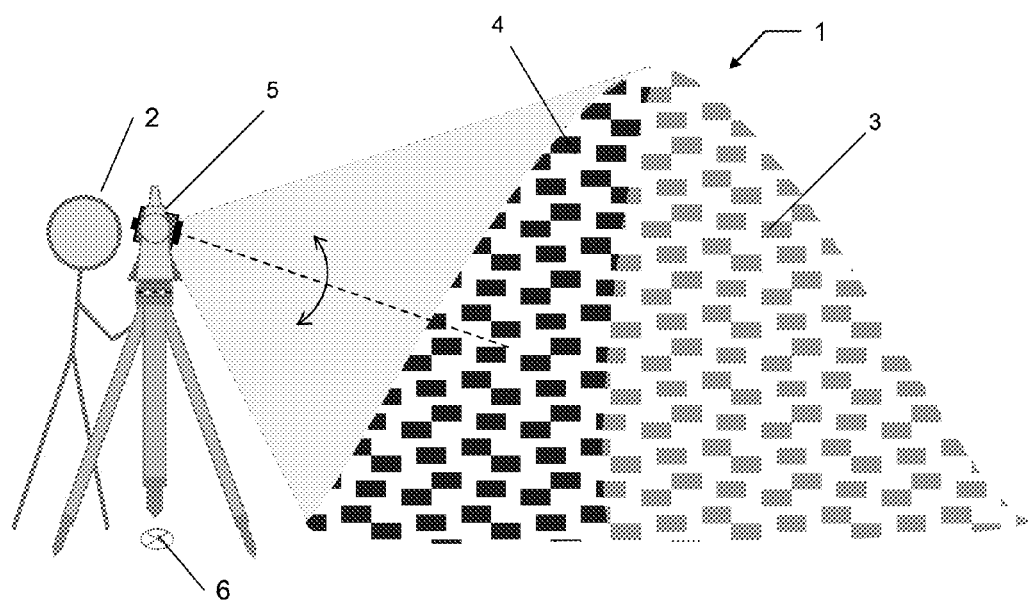
FIG. 1 shows an example for prior art.

FIG. 1 shows a prior art example for determination of the volume of an object 1, e.g. a stock pile. A user 2 sets up a total station 5 at a position 6 near the object 1. The object 1 is scanned, i.e. visible surface points 4 of the object 1 are measured and a point cloud is computed. As not the whole surface is visible from position 6, the total station 5 has to be set up at at least two other positions in order to measure surface points 3 hidden from position 6 to be able to establish a complete surface representation of the object 1. The point clouds resulting from three or more setups are combined and meshed. Then, the volume between the meshed surface and a ground surface is computed.

Figure 2A:
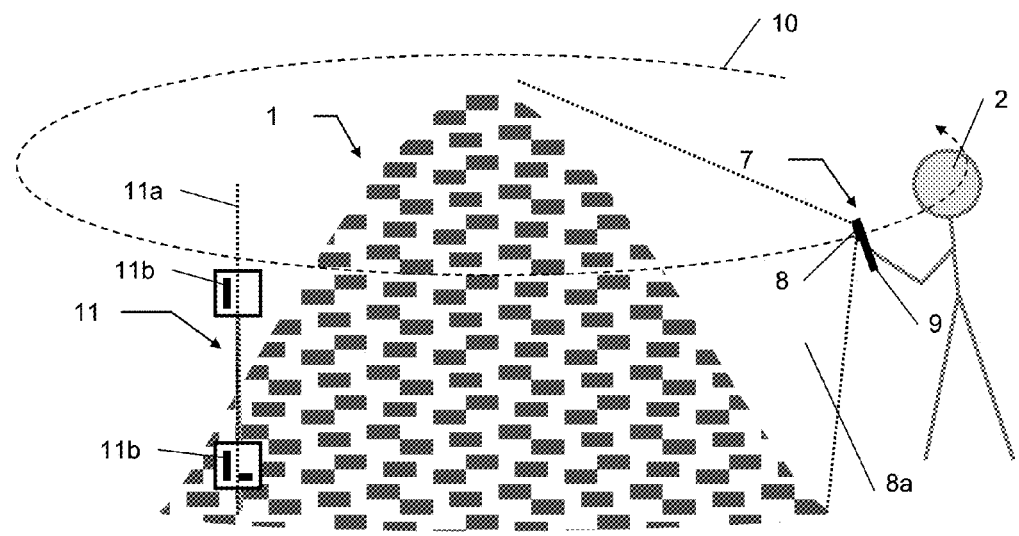
FIG. 2a,b show an example for acquisition of a set of images.
Figure 2B:
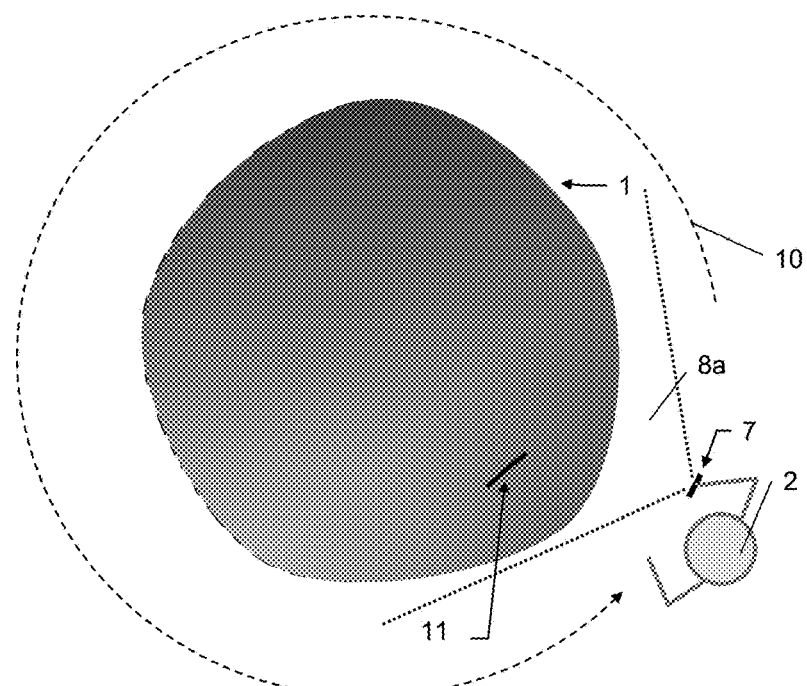

In FIG. 2a, a system for volume determination according to embodiments described herein is shown in form of a smartphone 7, which compromises a camera 8 and a control and evaluation unit 9. Alternatively, the system for volume determination may be part of a surveying instrument. The smartphone 7 is held by a user 2 in such a way, that the camera is facing towards the object 1 and the whole part of the surface of the object 1 that the camera 8 faces to is within the field of view 8a of the camera 8. In FIG. 2a and FIG. 2b (top view) the user 2 is walking along a path 10 around the object 1, while the camera 8 captures a series of images of the object 1. The rate with which the images are taken may be such that a video stream is generated. For example, the camera takes at least 15 pictures per second. The images show the object 1 as seen from different positions along the path 10. The series of images is stored on the smartphone 7 as an image data set, e.g. as a movie file. Onto the object 1 is placed a reference body 11 with its long axis 11*a* oriented vertically. The reference body 11 may compromise an inclination indicator such as a bubble level. The reference body 11 compromises two visually detectable markings 11*b*, which define two reference points having a known distance to each other. The reference body 11 is captured together with the object 1 in at least one image sub-group of the image data set and serves for scaling a spatial representation of the object 1 generated from the image data set. As it is vertically aligned, the imaged reference body 11 can also serve for vertically aligning the spatial representation. In the case of a reference body 11 that is to be aligned vertically, the visually detectable markings 11*b* preferably have different shapes, e.g. different codes, in order to enable the automated determination of the upright direction.

Figure 3:
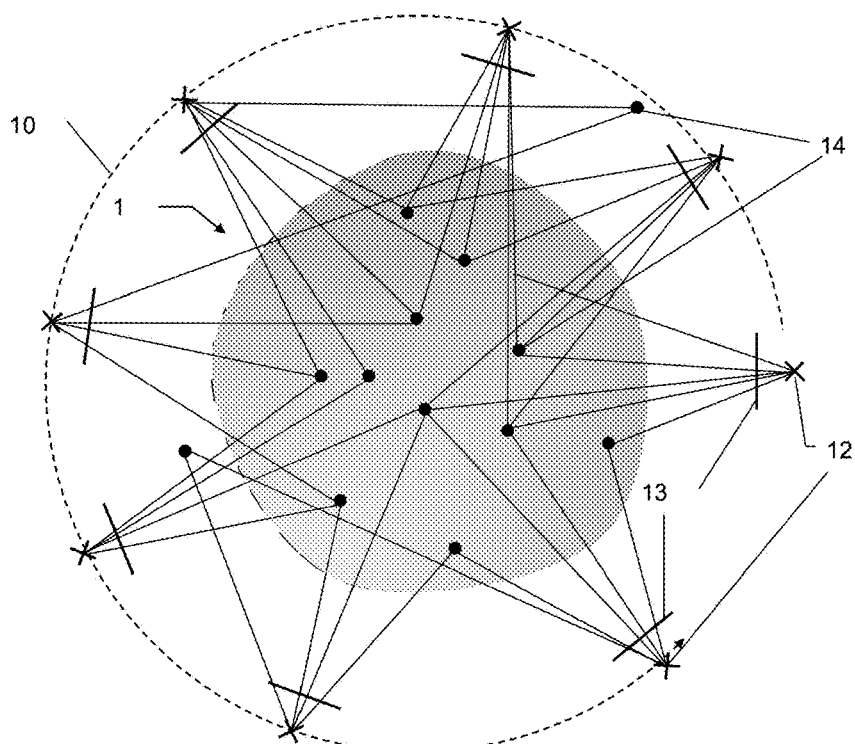
FIG. 3 shows an example for different camera positions and for a part of the structure from motion evaluation, FIG. 4a,b show examples for scaling and vertically orienting of a spatial representation of the object.

In FIG. 3, a top view of the object 1 is shown together with several examples of points 12 on the path 10 at which images of the object are taken. In this example, the projection center of the camera at each position is identical with a point 12. Of course, a projection center has not to be identical with a camera position, but can also be computed from a known camera position. The images 13 are represented by its image planes. A number of image correspondences are found for all pairs of images 13, for example by feature extraction which leads to the common feature points 14. This is done using feature detection and matching algorithms such as SIFT, SURF, BRISK, BRIEF, etc. Using a suitable pair of images the relative position and orientation of images 13 are determined in a local coordinate frame and a 3D reconstruction of feature points is computed, building a point cloud. In the next step each additional frame is added to the existing 3D reconstruction. Using already reconstructed 3D points the position and orientation of the camera 8 can be computed using resectioning. After adding a new frame, the positions of 3D points are refined using all measurements in the reconstructed frames.

The resulting point cloud can be used to compute the volume or can be further refined by a dense matching algorithm. Dense matching has the goal to find a dense point cloud, i.e. a 3D-coordinate for each pixel or a subset, e.g. on a regular 3×3 grid, i.e. for every third pixel in row and column direction, in the original images. The algorithm consists of two major steps.

First, for all overlapping cameras a disparity map is computed. This map contains the offset of a pixel in two images, i.e. the shift to be applied to a pixel in the first image to end up at the position of the corresponding point in the second image. There are multiple ways to compute these maps, correlation techniques, Semi-Global-Matching, etc.

Using this set of disparity maps 3D points are computed by forward intersection. Starting from each pixel a maximum number of corresponding pixels is found in other images 13. Using the disparities between images the corresponding point can be found. The 3D point is then computed using the set of image positions from all contributing images 13.

The final point cloud is filtered using several criteria on the measurement quality. This includes the number of images where the point is observed, the baseline for the measurement, a measure for the consistency of all the measurements, etc.

Figure 4A:
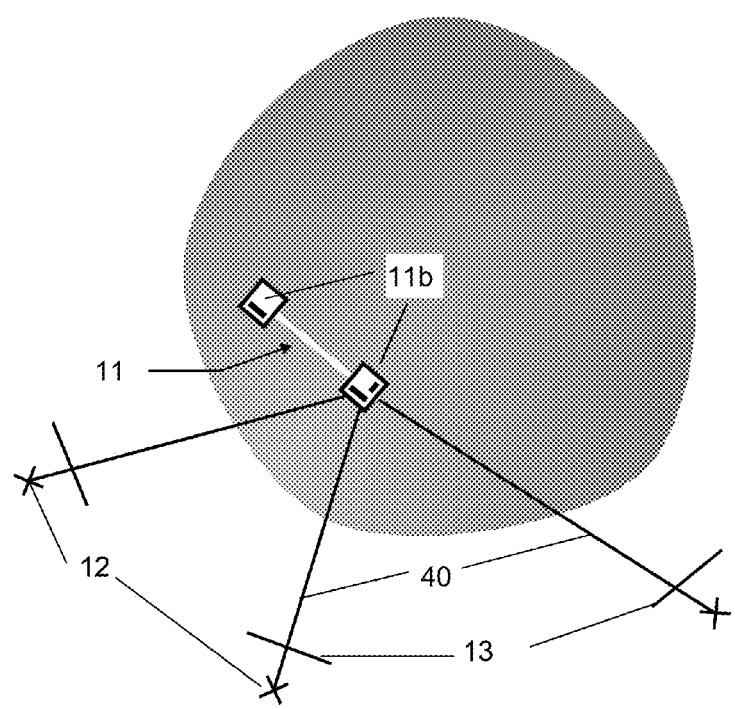

The scale of the point cloud resulting from SFM is determined using the images 13 which include the object 1 along with an elongated reference body 11, which is placed onto the object 1 (FIG. 4*a*). The two visually detectable markings 11*b* are identified automatically by means of image processing in all available images 13. The position of the reference point in each image 13 is determined and used to determine the 3D position of the marker using forward intersection (indicated by lines 40). As the true distance between the reference points is known, the scale can be applied to the point cloud by comparing their distance in the point cloud with the true distance. As the reference points are aligned vertically, they are used to transform the point cloud such that it is oriented vertically. The transformation (scale and possible vertical orientation) can be carried out as a post step.

It can be advantageous to use more than one elongated reference body 11. In that case, one elongated reference body 11 can be used for the derivation of the scale and the second one for checking. If at least two elongated reference bodies 11 are horizontally aligned (not parallel), e.g. by a bubble level, they define a horizontal plane with a normal vector that is vertical. Thus points defined by the markings of the elongated reference bodies 11 can be used to transform the point cloud such that it is oriented vertically.

Alternatively, the information resulting from the elongated reference bodies 11 can be directly introduced in a bundle adjustment that is carried out within structure-from-motion. The additional constraints have a positive effect on the stability of the algorithm.

Figure 4B:
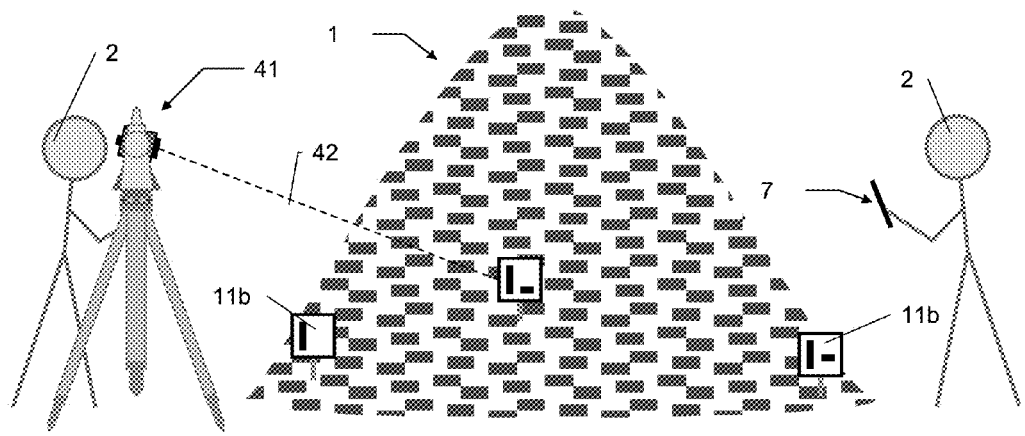

FIG. 4*b* shows another example for determination of the scale of the spatial representation. At least two visually detectable markings 11*b*, e.g. coded markers, are placed on the object 1 or close by, such that they are imaged at least on some images of the image set captured by camera 8 together with object 1. At least two points are defined by the detectable markings 11*b*. The positions of the visually detectable markings 11*b* in the point cloud are automatically detected in the point cloud, for example using an image processing algorithm for feature detection. The distance between points of the point cloud which represent the two points defined by two visually detectable markings 11*b* is scaled based on the absolute distance of the two defined points which is determined by a measurement with a surveying instrument 41, e.g. a tachymeter. A measurement of the absolute spatial positions (indicated by line 42) of defined points can be performed as a pre step, a post step or simultaneous to other steps. With the scaled distance the whole point cloud is absolutely referenced. If at least three points of the points cloud are absolutely referenced or if two absolute referenced points are aligned vertically to each other, the point cloud can be also vertically oriented. The transformation (scale and possible vertical orientation) can be carried out as a post step.

Figure 5A:
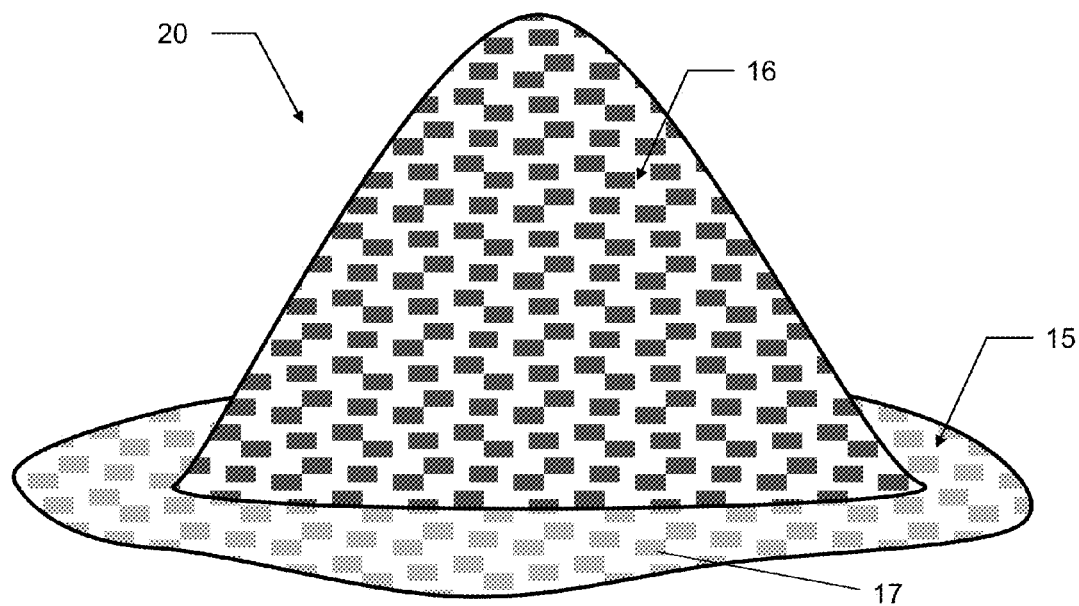
FIG. 5a-d show examples for definition of a ground surface, FIG. 6a,b show examples for calculation of the volume of the object, FIG. 7a,b show an example for an alternative method of generating a spatial representation of the object.

FIG. 5*a* shows a spatial representation of the object 1 in form of a point cloud 20. In order to determine a ground surface 17, points 15 are classified that lie on the ground surface 17 in contrast to points 16 that do not belong to the ground surface 17.

Figure 5B:
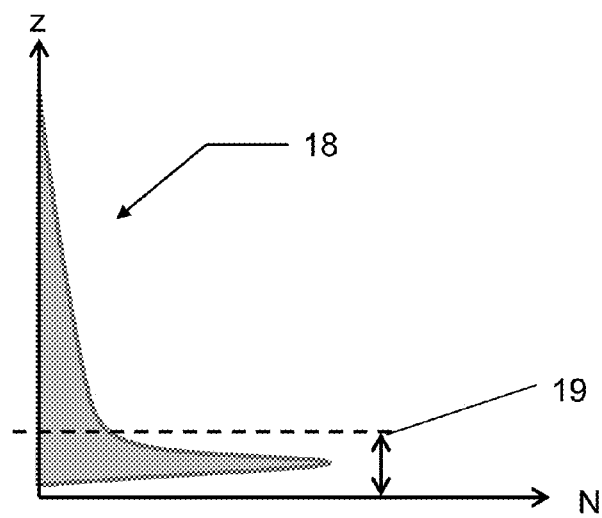

The classification can be based on the distribution of the points of the point cloud 20 with respect to the vertical. The histogram of FIG. 5*b* shows the distribution of the points of the points cloud 20 with respect to the z-axis of the coordinate system of the point cloud 20, which is identical to the vertical as the point cloud 20 has been oriented vertically. Such a distribution can also be based on only a part of the point cloud 20 as a part of the point cloud 20 can deliver in some cases a sufficient exact and complete distribution. For example, the classification is performed based on a point distribution of a partial point could 20 which has been calculated from a number of images showing the object 1 together with part of the ground while capturing of images and calculating of further points of the point cloud 20 is still in progress. It is assumed that the points with small z-coordinate are part of the ground surface 17. Therefore, a certain threshold 19 is introduced. All points with a z-coordinate within the threshold 19 are classified as points of the ground surface 17. The threshold 19 is automatically derived from a stored value or automatically set for example in dependence of the change rate (gradient) of N(z) and/or manually set by the user 2.

Alternatively, the classification of points of the point cloud 20 is manually carried out by the user 2.

Figures 5C, 5D:
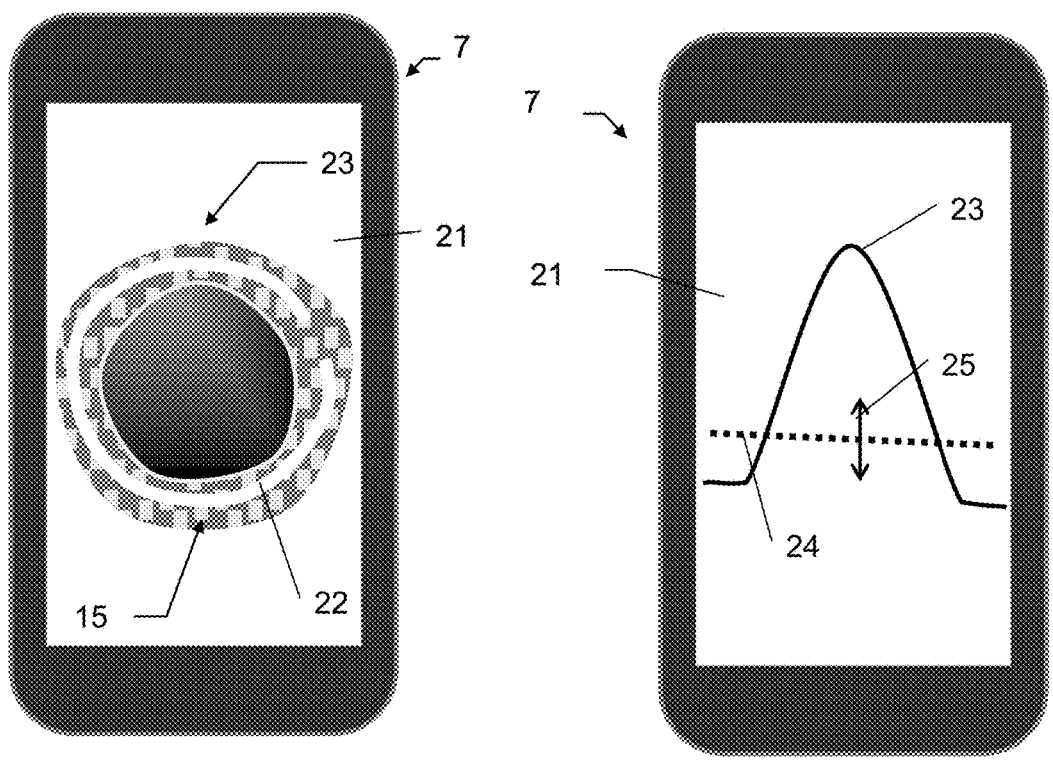

FIG. 5c shows the system in form of a smartphone 7. On the display 21, which is touch-sensitive, the point cloud 20 is displayed in profile 23 from a top view. The user can classify the points 15 by drawing a curve 22 on the display, e.g. with a stylus or his finger.

As an alternative to determine a ground surface 17 by point classification, the ground surface 17 can be defined by the user 2 manually. FIG. 5d shows the smartphone 7, which displays on the display 21 a profile 23 (cross section) of point cloud 20 together with a cross section 24 of the ground surface 17. The position and orientation of the cross section 24 relative to the cross section 23 is set and/or adjusted by the user 2 e.g. by shifting up and down (arrow 25) or by rotating with defined finger gestures.

Figure 6A:
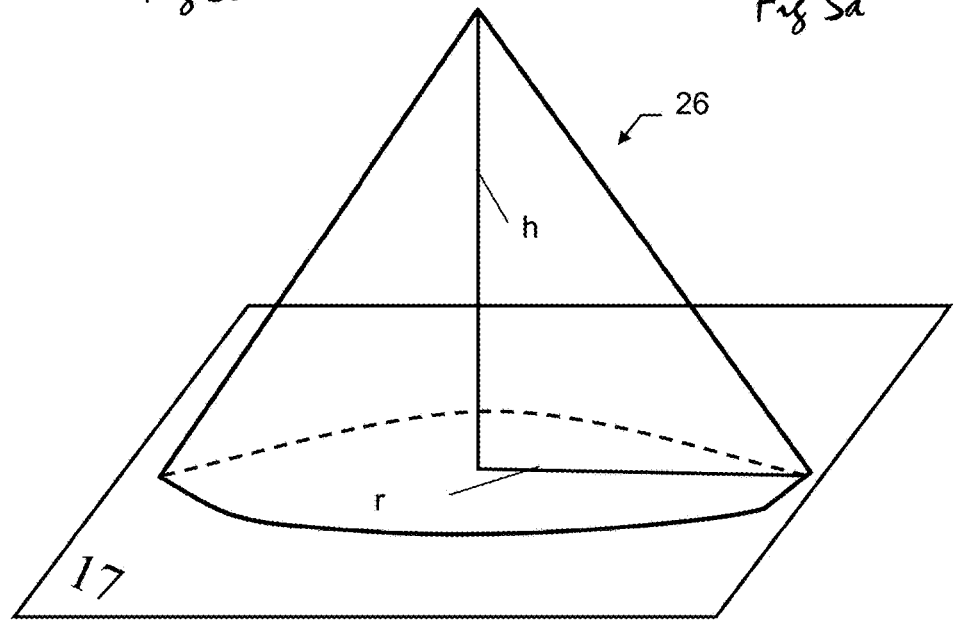

FIG. 6a shows an example for determination of the volume of the object 1, based on the scaled and vertically aligned point cloud 20 and the defined ground surface 17. A mathematically defined surface is fitted to the point cloud 20. In consideration of the ground surface 17, a mathematical object 26 is generated, in this example a cone with defined height h and radius r. The volume of the object 1 is determined as the volume of the mathematical object 26, which is calculated using the according equation for volume calculation of such a mathematical object 26. For the parametrization of the mathematical object 26, it can be assumed that the rotation axis is vertical. If the material is known, e.g. gravel or sand, the slope can be derived from the material properties, e.g. for sand the angle repose is about 30°. Such assumptions can also be applied, when a 3D spline or a free-form surface is fitted, i.e. the tangential plane at the top most point of the surface should be approximately horizontal. In case of sand, the tangential plane of the surface should be tilted by 30°, etc.

As an alternative to fitting a mathematically defined surface, the surface of the object 1, e.g. the stock pile, can be determined with a 3D triangulation of the point cloud 20. Alternatively, the surface of object 1 is determined using a 2D triangulation. First, the points are projected orthogonally to the ground surface 17. Then, a Delaunay triangulation in 2D is performed. Finally, the points are back-projected to 3D. Additionally the point cloud 20 can be smoothed and filtered, e.g. by applying a 3D spline or a free-form surface. The volume of the object is determined as the enclosed volume between the triangulated surface and the ground surface 17.

In some cases, the set of images taken of object 1 might cover only part of it. In such a case, symmetry assumptions can be used to approximate the volume of the whole object 1 as shown in FIG. 6b. To the cross section 23 of the point cloud 20 an outline 27, e.g. a parabolic curve, is fitted. A symmetry axis 28 is defined, either automatically in dependence of the outline 27 or manually by the user 2. Then, a rotation of the outline 27 with respect to symmetry axis 28 may result in a paraboloid of revolution 29. After insertion of the ground surface 17, the approximated volume of the object 1 is calculated as the volume enclosed between the ground surface 17 and the paraboloid of revolution 29.

FIG. 7a and/or 7b show a method for generating a spatial representation without generating a point cloud. The method is based on the visual hull approach. Here, by segmentation a defined shape 43 in an image of object 1 is separated from the background 44 in each image of the image data set (FIG. 7a). FIG. 7b shows in a top view three of the multiple camera positions 12, which are determined using a structure from motion algorithm and in the example, are identical with a projection center of a camera. Also known from SFM are the orientations of the cameras. Going out from a projection center 12, a cone 45 is defined by a shape 43. A spatial representation 46 is defined by the spatial intersection of all cones, wherefrom a volume of the spatial representation 46 is directly calculated.

Figure 8:
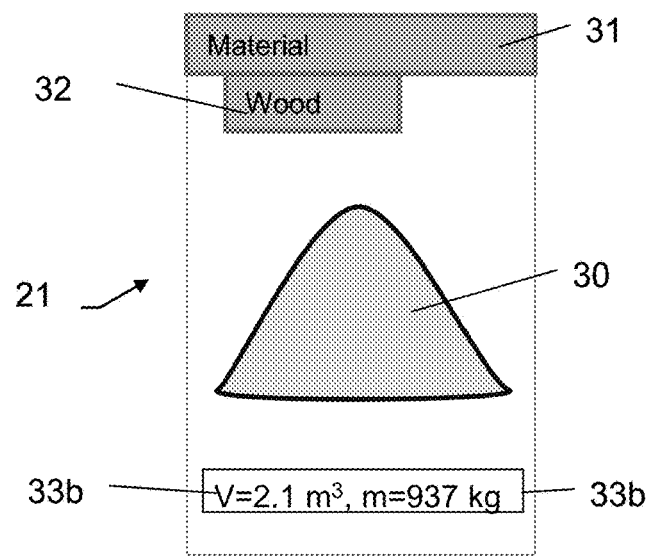
FIG. 8 shows an example for weight determination functionality, FIG. 9a,b show examples for further functionalities of embodiments described herein.

FIG. 8 shows the display 21 of the system for volume determination with functionality for determining the weight of the object 1. Displayed is an image 30 of the object 1, which is derived from the point cloud 20. Moreover, a user menu 31 is shown, from which the user 2 can select the material which the object 1 consists of out of a list of different materials such as sand, wood, concrete, steel, etc. In the example, a window 32 displays the selected material "wood". The system then calculates the weight of the object 1 from its previously determined volume and a value for the chosen material's density, which is looked up in a look-up-table, which can be locally stored in the system or transmitted from a server using a wireless connection. The calculated value of the object's weight is outputted, together with its volume (33). For a more precise value, the material can be defined more precisely by selecting a more specific material out of a submenu. For example, once "wood" is selected, the user 2 can select which kind of wood it is out of several displayed suggestions.

Figure 9A:
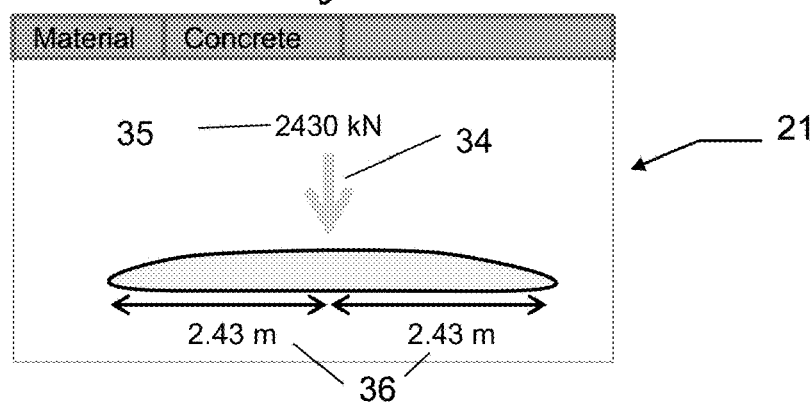

FIG. 9a shows the display 21 of the system for volume determination with functionality for determining the barycenter 34 of the object 1. Under the assumption, that the object 1 consists of only one at least nearly homogeneous material, the barycenter 34 of the object 1 can be calculated out of the determined spatial representation. In case of an object 1 assembled from sub-objects out of different materials, corresponding arrays of the point cloud 20 are defined by the user 2 or automatically, the material for each array is specified and the barycenter 34 of the whole object 1 is then calculated thereof. In the example, the position of the barycenter is indicated to the user 2 on the display 21 using an image 30 of the object 1, which is derived from the point cloud 20 by arrow 34 together with information about its distance to the object's limits (36) and the force necessary for lifting it (35).

Figure 9B:
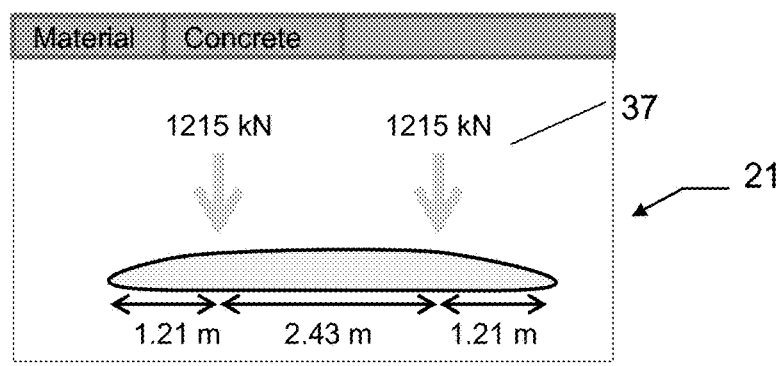

If further material properties of the object 1 are known from user input or from a look-up-table, more information can be derived and displayed to the user 2 on the display 21 as shown in FIG. 9b. The volume and the stiffness of the object 1 are used to calculate and output information (37) at which parts of the object 1 to put devices for lifting the object 1 (e.g. ropes) and about the forces necessary to lift the object 1 at each part.

Although embodiments of the invention are illustrated above, partly with reference to some preferred embodiments, it must be understood that numerous modifications and combinations of different features of the embodiments can be made. All of these modifications lie within the scope of the appended claims.

What is claimed is:

1. A method for determination of an absolute volume of a construction site object on a construction site, the method comprising:
    moving a mobile camera along a path around the construction site object while orienting the camera repeatedly onto the construction site object,
    in the course of this movement, capturing a series of images of the construction site object with the camera, the series comprising a plurality of images captured from different points on the path and with different orientations of the camera, the series being represented by an image data set collected thereby,
    performing a structure from motion evaluation with a defined algorithm using the series of images and generating a spatial representation comprising a surface of the construction site object therefrom,
    scaling the spatial representation with given scaling information about a known absolute reference regarding scale,
    defining a ground surface for the construction site object and applying it onto the spatial representation, and
    calculating and outputting the absolute volume of the construction site object based on the scaled spatial representation and the defined ground surface,
    the method further comprising at least one of:
    an elongated reference body that defines a long axis due to its elongated shape and comprises at least two defined visually detectable markings,
        wherein at least two points are defined on the reference body by the markings, and
        wherein an absolute distance in between the at least two points where the spatial relationship of the at least two points with respect to the long axis of the reference body, being known,
        wherein the elongated reference body is placed with its long axis aligned vertically on or next to the construction site object of which the volume is to be determined before moving the camera and capturing the series of images,
        wherein the series of images comprises a sub-group of images of the plurality of images, in which images of the sub-group the reference body, being placed on or next to the construction site object, is also captured,
        wherein at least two spatial positions relative to the spatial representation are determined for the at least two points also based on the structure from motion evaluation, and
        wherein the spatial representation is scaled based on a measured distance in between the determined at least two spatial positions and the known absolute distance in between the at least two points and vertically oriented based on the determined at least two spatial positions relative to the spatial representation and the known spatial relationship of the at least two points with respect to the long axis; and/or
    at least two defined visually detectable markings, whereby at least two points are defined, are placed on or next to the construction site object of which the volume is to be determined before moving the camera and capturing the series of images, wherein:
        for each point of the at least two points an absolute spatial position is determined with absolute reference by use of a surveying instrument,
        the series of images comprises images, in which images the markings, being placed on or next to the construction site object, are also captured,
        for each point of the at least two points a spatial position is determined also based on the structure from motion evaluation, and
        the spatial representation is scaled and also vertically oriented based on an assignment of its determined absolute spatial position to its spatial position being determined based on the structure from motion evaluation.

2. The method according to claim 1, wherein the series of images is captured in a way in that the camera automatically repeatedly captures images with a rate of at least one picture per second.

3. The method according to claim 1, further comprising:
    calculating the absolute weight of the construction site object based on the calculated volume and a given density for the construction site object and outputting the calculated absolute weight, wherein
    a user inputs a density value,
    a look-up table with several density values for several defined types of materials is stored and a user is to input the type of material of the construction site object or the material is automatically classified by processing at least one of the images of the series of images,
    calculating and outputting a location of the barycenter of the construction site object, wherein an instruction of action is derived based on the spatial representation and the calculated position of the barycenter.

4. The method according to claim 1, wherein the ground surface for the construction site object is defined by any of the following:
    by a user input, wherein a profile of the spatial representation is displayed to a user and a line standing for the ground surface is settable at a desired location in and relative to the displayed profile, or
    by a defined evaluation algorithm, wherein at least one of: the shape of the spatial representation is analyzed, or the ground surface is varied until a best-fit within the spatial representation is reached.

5. The method according to claim 1, wherein the structure from motion evaluation with the defined algorithm comprises:
    determining camera position and orientation of images of the series of images relative to each other, based on resection using points of a construction site object represented in at least two images, wherein construction site object points for resectioning are defined using at least one of: a feature extraction, or a tracking algorithm,
    based on the determined camera positions and orientations, computing the 3D-positions of points of the construction site object relative to each other by forward intersection in images of the series of images thereby forming a spatial representation of the construction site object, wherein the spatial representation is refined using at least one of: a bundle adjustment, or dense matching algorithm.

6. The method according to claim 1, wherein the moving of the mobile camera along a path around the construction site object while orienting the camera repeatedly is performed while orienting the camera continuously onto the construction site object.

7. A construction site object volume determination system, the system comprising:
    a mobile camera for capturing images, and
    a control and evaluation unit, the control and evaluation unit having a stored program with code so as to control and execute a volume determination functionality in which using a series of images of the construction site object being captured with the mobile camera, the series comprising a plurality of images captured from different points on a path around the construction site object and with different orientations of the mobile camera, without the need of maintaining a certain orientation of the camera, as well as using given information about a known absolute reference regarding scale, wherein the volume determination functionality comprises:
- a structure from motion evaluation with a defined algorithm using the series of images is performed and a spatial representation comprising a surface of the construction site object is generated therefrom,
- the spatial representation is scaled with the given known absolute reference,
- a ground surface for the construction site object is defined, wherein the ground surface is derived by an automatically performed predefined evaluation or wherein an inquiry is made to a user to input information defining the ground surface, and is applied onto the spatial representation and
- the absolute volume of the construction site object is calculated based on the scaled spatial representation and the defined ground surface and is output, the system further comprising at least one of:
an elongated reference body that defines a long axis due to its elongated shape and comprises at least two defined visually detectable markings,
- wherein at least two points are defined on the reference body by the markings, and
- wherein an absolute distance in between the at least two points and the spatial relationship of the at least two points with respect to the long axis of the reference body, being known, and
- wherein the reference body is foreseen to be placed by a user with its long axis aligned vertically on or next to the construction site object of which the volume is to be determined before capturing the series of images,
- wherein, when the series of images comprises a sub-group of images of the plurality of images, the reference body being placed on or next to the construction site object being captured in the images of the sub-group, in the functionality controlled and executed by the control and evaluation unit,
- at least two spatial positions relative to the spatial representation are determined for the at least two points also based on the structure from motion evaluation, and
- the spatial representation is:
  - scaled based on a measured distance in between the determined at least two spatial positions and the known absolute distance in between the at least two points and vertically oriented based on the determined at least two spatial positions relative to the spatial representation and the known spatial relationship of the at least two points with respect to the long axis; and/or
- at least two defined visually detectable markings, whereby at least two points are defined, are placed on or next to the construction site object of which the volume is to be determined before moving the camera and capturing the series of images, wherein:
  - for each point of the at least two points an absolute spatial position is determined with absolute reference by use of a surveying instrument,
  - the series of images comprises images, in which images the markings, being placed on or next to the construction site object, are also captured,
  - for each point of the at least two points a spatial position is determined also based on the structure from motion evaluation, and
  - the spatial representation is scaled based on an assignment of its determined absolute spatial position to its spatial position being determined based on the structure from motion evaluation, wherein the spatial representation is also vertically oriented based on an assignment of its determined absolute spatial position to its spatial position being determined based on the structure from motion evaluation.

8. The system according to claim 7, wherein the spatial representation comprises a point cloud.

9. The system according to claim 7, wherein the construction site object comprises a stock pile.

10. The system according to claim 7, wherein in the functionality controlled and executed by the control and evaluation unit the camera is caused to automatically repeatedly capture images with a rate of at least one picture per second.

11. The system according to claim 7, wherein the camera captures images in a video stream with a frame rate of at least 15 Hz.

12. The system according to claim 7, wherein the camera comprises a mobile field controller of a surveying system comprising at least one of: a total station GNSS-components.

13. A non-transitory computer readable medium comprising:
computer-executable instructions stored on the non-transitory computer readable medium that when executed perform a method for controlling and executing a functionality for determining a volume of a construction site object on a construction site, the method comprising:
- obtaining a series of images of the construction site object being captured with a camera, the series comprising a plurality of images captured from different points on a path around the construction site object and with different orientations of the camera as well as using information about a known absolute reference regarding scale,
- performing a structure from motion evaluation with a defined algorithm using the series of images and a spatial representation, comprising a surface of the construction site object is generated therefrom,
- scaling the spatial representation with the given known absolute reference,
- defining a ground surface for the construction site object, wherein the ground surface is derived by an automatically performed predefined evaluation or wherein an inquiry is made to a user to input information defining the ground surface, and is applied onto the spatial representation, and
- calculating the absolute volume of the construction site object based on the scaled spatial representation and the defined ground surface and is output, the method further comprising at least one of:
an elongated reference body that defines a long axis due to its elongated shape and comprises at least two defined visually detectable markings,
- wherein at least two points are defined on the reference body by the markings, and wherein an absolute distance in between the at least two points where the spatial relationship of the at least two points with respect to the long axis of the reference body, being known, wherein the elongated reference body is placed with its long axis aligned vertically on or next to the construction site object of which the volume is to be determined before moving the camera and capturing the series of images, wherein the series of images comprises a sub-group of images of the plurality of images, in which images of the sub-group the reference body, being placed on or next to the construction site object, is also captured, wherein at least two spatial positions relative to the spatial representation are determined for the at least two points also based on the structure from motion evaluation, and wherein the spatial representation is scaled based on a measured distance in between the determined at least two spatial positions and the known absolute distance in between the at least two points and vertically oriented based on the determined at least two spatial positions relative to the spatial representation and the known spatial relationship of the at least two points with respect to the long axis; and/or at least two defined visually detectable markings, whereby at least two points are defined, are placed on or next to the construction site object of which the volume is to be determined before moving the camera and capturing the series of images, wherein:
  for each point of the at least two points an absolute spatial position is determined with absolute reference by use of a surveying instrument,
  the series of images comprises images, in which images the markings, being placed on or next to the construction site object, are also captured,
  for each point of the at least two points a spatial position is determined also based on the structure from motion evaluation, and
    the spatial representation is scaled and also vertically oriented based on an assignment of its determined absolute spatial position to its spatial position being determined based on the structure from motion evaluation.

14. A method for generating and geo-referencing a spatial representation of a construction site object to be measured, the method comprising:
  placing at least three defined visually detectable markings, whereby at least three points are defined, on or next to the construction site object,
  determining for each point of the at least three points an absolute spatial position with geo-reference by use of a surveying instrument,
  moving a mobile camera along a path around the construction site object while orienting the camera repeatedly onto the construction site object,
  in the course of this movement, capturing a series of images of the construction site object with the camera, the series comprising a plurality of images captured from different points on the path and with different orientations of the camera, without the need of maintaining a certain orientation of the camera, the plurality of images also including, for each of the at least three markings, several images where the construction site object is captured together with the respective marking, and the series being represented by an image data set collected thereby,
  performing a structure from motion evaluation with a defined algorithm using the series of images,
  generating the spatial representation of the construction site object and determining, for each point of the at least three points, a relative spatial position with relation to the spatial representation, both based on the structure from motion evaluation,
  assigning, for each point of the at least three points, its absolute spatial position to its relative spatial position and
  using the geo-reference of the absolute spatial positions together with the respectively assigned relative spatial positions and its respective relation to the spatial representation for geo-referencing the spatial representation.

15. The method according to claim 14, wherein the moving of the mobile camera along a path around the construction site object while orienting the camera repeatedly is performed while orienting the camera continuously onto the construction site object.

16. A system for generating and geo-referencing a spatial representation of a construction site object to be measured, the system comprising:
  a mobile camera for capturing images,
  a control and evaluation unit, and
  at least three defined visually detectable markings, whereby at least three points are defined, wherein the visually detectable markings are foreseen to be placed by a user on or next to the construction site object and to be surveyed by a surveying instrument, whereby for each point of the at least three points an absolute spatial position with geo-reference is determined,
  wherein the control and evaluation unit has a non-transitory computer readable medium with computer-executable instructions that when executed perform a method for controlling and executing a functionality for generating and geo-referencing a spatial representation in which, using a series of images of the construction site object being captured with the camera, the series comprising a plurality of images captured from different points on a path around the construction site object and with different orientations of the camera, without the need of maintaining a certain orientation of the camera, wherein the plurality of images include, for each of the at least three markings, several images where the construction site object is captured together with the respective marking, as well as using determined absolute spatial positions for the at least three points based on surveying the at least three markings with a surveying instrument,
  a structure from motion evaluation with a defined algorithm using the series of images is performed,
  a spatial representation of the construction site object is generated and for each point of the at least three points, a relative spatial position with relation to the spatial representation is determined, both based on the structure from motion evaluation,
  for each point of the at least three points, the absolute spatial position is assigned to the respective relative spatial position, and
  the geo-reference of the absolute spatial positions together with the respectively assigned relative spatial positions and its respective relation to the spatial representation are used for geo-referencing the spatial representation.

17. The system according to claim 16, wherein the camera is caused to automatically repeatedly capture images with a rate of at least one picture per second, and wherein the camera is a built-in component of a hand-held unit.

18. A method for determination of an absolute volume of a construction site object on a construction site, the method comprising:
- moving a mobile camera along a path around the construction site object while orienting the camera repeatedly onto the construction site object,
- wherein the camera comprises a mobile field controller of a surveying system comprising a total station and/or GNSS-components,
- in the course of this movement, capturing a series of images of the construction site object with the camera, the series comprising a plurality of images captured from different points on the path and with different orientations of the camera, the series being represented by an image data set collected thereby,
- performing a structure from motion evaluation with a defined algorithm using the series of images and generating a spatial representation comprising a surface of the construction site object therefrom,
- scaling the spatial representation with given scaling information about a known absolute reference regarding scale,
- defining a ground surface for the construction site object and applying it onto the spatial representation and
- calculating and outputting the absolute volume of the construction site object based on the scaled spatial representation and the defined ground surface,
- the method further comprising
- determination of positions and/or changes of position and/or accelerations with absolute reference in dependency of the motion of the camera along its path around the construction site object, using
  - an inertial measurement unit fixed with respect to the camera,
  - a GNSS-Sensor fixed with respect to the camera,
  - a tachymeter, a total station, a laser tracker or a tracking 3D-position-determining camera-system, and/or
  - a stereo-camera-system or a pattern-projector-camera-system, measuring positions of the camera, and
- the spatial representation is scaled and vertically oriented based on the determined positions and/or changes of position and/or accelerations, respectively, in relation to derived relative positions of points on the path where images of the series of images have been captured by the camera, which positions and orientations are derived based on the structure from motion evaluation relative to the spatial representation.

19. A construction site object volume determination system, the system comprising:
- a mobile camera for capturing images,
- wherein the camera comprises a mobile field controller of a surveying system comprising a total station and/or GNSS -components, and
- a control and evaluation unit, the control and evaluation unit having a stored program with code so as to control and execute a volume determination functionality in which using a series of images of the construction site object being captured with the mobile camera, the series comprising a plurality of images captured from different points on a path around the construction site object and with different orientations of the mobile camera, without the need of maintaining a certain orientation of the camera, as well as using given information about a known absolute reference regarding scale, wherein the volume determination functionality comprises:
  - a structure from motion evaluation with a defined algorithm using the series of images is performed and a spatial representation comprising a surface of the construction site object is generated therefrom,
  - the spatial representation is scaled with the given known absolute reference,
  - a ground surface for the construction site object is defined, wherein the ground surface is derived by an automatically performed predefined evaluation or wherein an inquiry is made to a user to input information defining the ground surface, and is applied onto the spatial representation and
  - the absolute volume of the construction site object is calculated based on the scaled spatial representation and the defined ground surface and is output, the system further comprising:
- the camera comprises a built-in component of a hand-held unit, the hand-held unit further comprising a sensor for determination of positions and/or changes of position and/or accelerations with absolute reference in dependency of motion of the camera, wherein an inertial measurement unit fixed with respect to the camera and/or a GNSS-sensor fixed with respect to the camera,
- wherein in the functionality controlled and executed by the control and evaluation unit the spatial representation is scaled based on the positions and/or changes of position and/or accelerations determined by the inertial measurement unit and/or GNSS -sensor, respectively, in relation to derived relative positions of points on the path where images of the series of images have been captured by the camera, which positions are derived based on the structure from motion evaluation relative to the spatial representation, wherein the spatial representation is also vertically oriented based on the positions and/or changes of position and/or accelerations determined by the inertial measurement unit and/or GNSS-sensor, respectively, in relation to derived relative positions of points on the path where images of the series of images have been captured by the camera, which positions are derived based on the structure from motion evaluation relative to the spatial representation.

* * * * *